(12) United States Patent
Kawasumi et al.

(10) Patent No.: US 8,694,215 B2
(45) Date of Patent: Apr. 8, 2014

(54) CONTROL DEVICE AND CONTROL METHOD FOR CONTINUOUSLY VARIABLE TRANSMISSION

(75) Inventors: Takuro Kawasumi, Ebina (JP); Jouji Seki, Zama (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 1118 days.

(21) Appl. No.: 12/470,598

(22) Filed: May 22, 2009

(65) Prior Publication Data

US 2009/0299588 A1    Dec. 3, 2009

(30) Foreign Application Priority Data

May 30, 2008   (JP) .................................. 2008-142733

(51) Int. Cl.
*G06F 7/00*   (2006.01)
*G06F 17/00*  (2006.01)
*G06F 19/00*  (2011.01)

(52) U.S. Cl.
USPC .................... 701/51; 477/34; 477/44; 477/46

(58) Field of Classification Search
USPC ............. 701/51, 55, 62, 66; 180/233; 477/34, 477/37, 38, 43, 44, 45, 46, 50
See application file for complete search history.

(56) References Cited

U.S. PATENT DOCUMENTS

| | | | |
|---|---|---|---|
| 4,670,843 A * | 6/1987 | Matsumura et al. | 701/61 |
| 4,702,128 A * | 10/1987 | Oshiage | 477/48 |
| 4,736,655 A * | 4/1988 | Kumura et al. | 477/48 |
| 4,823,267 A | 4/1989 | Kumura | |
| 5,005,442 A * | 4/1991 | Sakakibara et al. | 477/41 |
| 5,067,372 A * | 11/1991 | Suzuki | 477/38 |
| 5,240,094 A * | 8/1993 | Suzuki | 192/220 |
| 5,366,420 A * | 11/1994 | Kuriyama et al. | 475/129 |
| 5,435,795 A * | 7/1995 | Mochizuki et al. | 477/39 |
| 5,527,231 A * | 6/1996 | Seidel et al. | 477/46 |
| 5,731,977 A * | 3/1998 | Taniguchi et al. | 701/96 |
| 5,871,416 A * | 2/1999 | Sawada et al. | 477/47 |
| 5,885,186 A * | 3/1999 | Van Wijk et al. | 477/43 |
| 6,459,977 B1 * | 10/2002 | Taffin et al. | 701/51 |

FOREIGN PATENT DOCUMENTS

| | | |
|---|---|---|
| EP | 0 373 865 A2 | 6/1990 |
| JP | 07-229544 A | 8/1995 |
| JP | 11-13876 A | 1/1999 |
| JP | 2000-346191 A | 12/2000 |

* cited by examiner

*Primary Examiner* — Khoi Tran
*Assistant Examiner* — Jaime Figueroa
(74) *Attorney, Agent, or Firm* — Foley & Lardner LLP

(57) ABSTRACT

A gear ratio control unit is provided to set a target gear ratio on the basis of an operating condition of the vehicle. The gear ratio control unit controls a drive amount of a step motor such that an actual gear ratio converges with the target gear ratio, and when a deceleration of the vehicle exceeds a predetermined threshold, controls the gear ratio by controlling the drive amount of the step motor such that a predetermined gear ratio is maintained. The gear ratio control unit determines the predetermined threshold on the basis of the actual gear ratio upon detection of an operation of a brake.

6 Claims, 6 Drawing Sheets

CONTROL DEVICE AND CONTROL METHOD FOR CONTINUOUSLY VARIABLE TRANSMISSION

TECHNICAL FIELD OF THE INVENTION

This invention relates to a belt type continuously variable transmission, and more particularly to a control device for a belt type continuously variable transmission with which an improvement in a restarting ability of a vehicle following rapid deceleration can be achieved.

BACKGROUND OF THE INVENTION

A belt type continuously variable transmission transmits power using a belt wound around a drive pulley (primary pulley) and a driven pulley (secondary pulley).

When a vehicle installed with this belt type continuously variable transmission decelerates rapidly, a downshift is performed rapidly in accordance with the deceleration to secure a restarting ability following the deceleration.

When a downshift is performed rapidly in this manner, an oil pressure of the drive pulley decreases rapidly, and as a result, a gripping force of the belt in relation to the drive pulley decreases transiently. In this condition, vehicle wheels may lock and the belt may slip due to an increase in inertial torque during the downshift or the like.

JP11-13876A discloses a control device for a continuously variable transmission which prevents this type of belt slippage from occurring by performing rapid deceleration gear ratio fixing control during rapid deceleration. In this control, a gear ratio is fixed at a predetermined High side gear ratio when the deceleration reaches or exceeds a predetermined value, and as a result, the oil pressure of the drive pulley is secured.

SUMMARY OF THE INVENTION

However, in the invention disclosed in JP11-13876A, a deceleration serving as a control threshold is fixed at the predetermined value. Therefore, the rapid deceleration gear ratio fixing control described above is executed even during deceleration at which belt slippage does not occur, for example during deceleration while traveling uphill or the like, when the deceleration is perceived to be greater than rapid deceleration on a flat road, and as a result, the gear ratio is fixed at the predetermined High side gear ratio.

When the control is performed in this case and the vehicle continues decelerating to a stop, the restarting ability of the vehicle on the uphill road deteriorates.

This invention has been designed in consideration of the problem described above, and it is an object thereof to provide a control device for a belt type continuously variable transmission which determines whether or not to fix a gear ratio during rapid deceleration on the basis of an actual gear ratio.

According to an aspect of the invention, a control device comprises a deceleration detecting unit that detects a deceleration of the vehicle, a brake operation detecting unit that detects an operation of a brake, and a gear ratio control unit that sets a target gear ratio on the basis of an operating condition of the vehicle, controls a drive amount of a step motor such that an actual gear ratio converges with the target gear ratio, and when the deceleration of the vehicle exceeds a predetermined threshold, controls the gear ratio by controlling the drive amount of the step motor such that a predetermined gear ratio is maintained, wherein the gear ratio control unit determines the predetermined threshold on the basis of the actual gear ratio upon detection of an operation of the brake.

According to another aspect of the invention, a control method for a belt type continuously variable transmission in which a belt is wound around a primary pulley into which a power output by a driving force source is input and a secondary pulley connected to an output side of a driving system of a vehicle, and an oil pressure supplied to the primary pulley is regulated by driving a step motor, thereby modifying a groove width of the primary pulley and the secondary pulley such that a rotation speed of the driving force source is output while being varied continuously is provided. The method comprising: a deceleration detecting step for detecting a deceleration of the vehicle; a brake operation detecting step for detecting an operation of a brake; and a gear ratio control step for setting a target gear ratio on the basis of an operating condition of the vehicle, controlling a drive amount of the step motor such that an actual gear ratio converges with the target gear ratio, and when the deceleration of the vehicle exceeds a predetermined threshold, controlling the gear ratio by controlling the drive amount of the step motor such that a predetermined gear ratio is maintained, wherein the gear ratio control step determines the predetermined threshold on the basis of the actual gear ratio upon detection of an operation of the brake.

According to these aspects, the predetermined gear ratio is maintained when the deceleration of the vehicle exceeds the predetermined threshold, but since the predetermined gear ratio is determined on the basis of the actual gear ratio, deterioration of the restarting ability occurring when the vehicle stops with the gear ratio in a fixed condition, particularly on an uphill road or the like, can be prevented.

The details as well as other features and advantages of this invention are set forth in the remainder of the specification and are shown in the accompanying drawings.

DESCRIPTION OF THE PREFERRED EMBODIMENTS

An embodiment of this invention will be described below on the basis of the figures.

Figure 1:
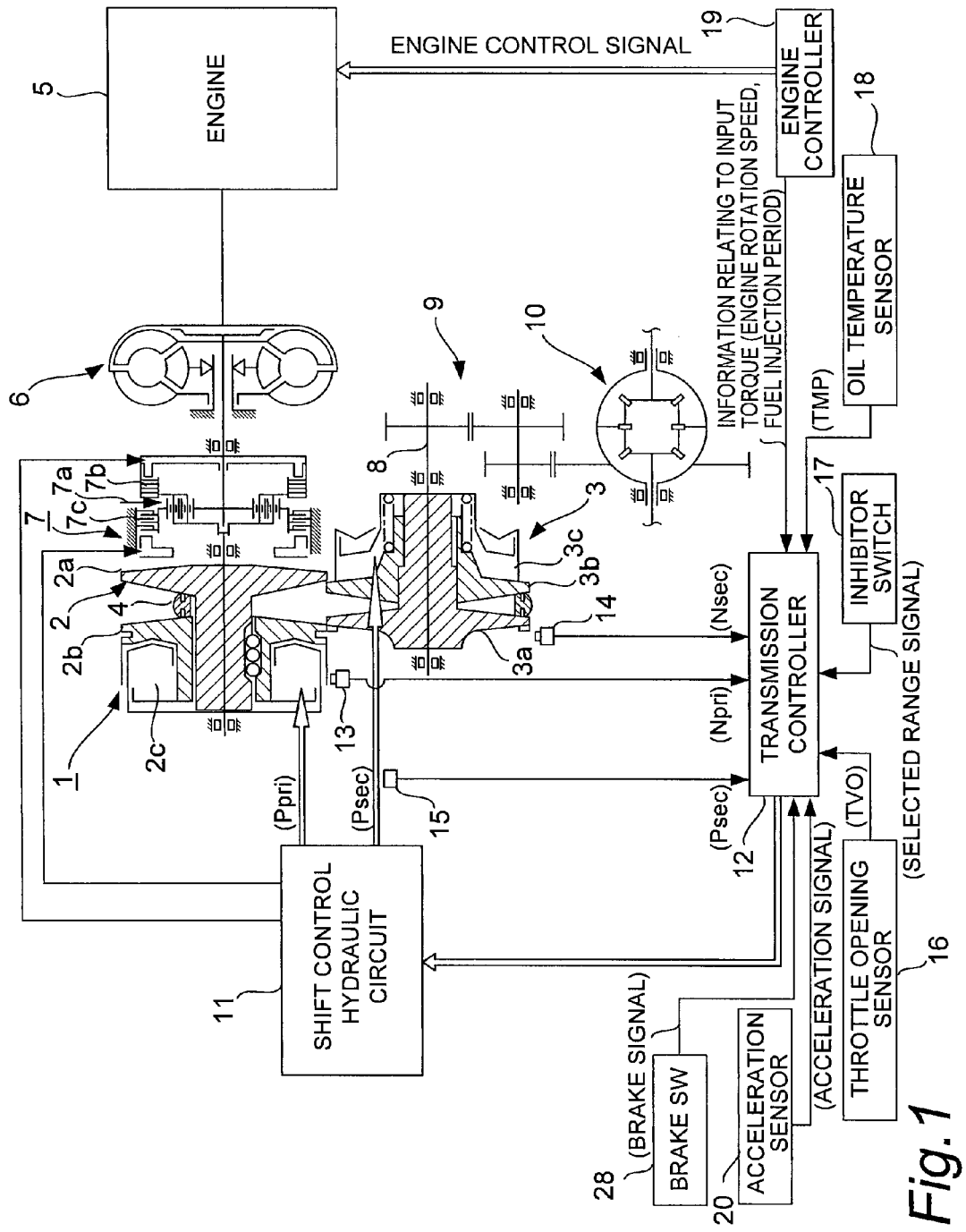
FIG. 1 is a constitutional diagram of a continuously variable transmission according to an embodiment of this invention.

FIG. 1 is a block diagram showing a V belt continuously variable transmission 1.

The V belt continuously variable transmission 1 includes a primary pulley 2 and a secondary pulley 3 disposed such that respective V grooves thereof are aligned, and a V belt (belt) 4 wound around the V grooves of the pulleys 2, 3. An engine 5 is disposed coaxially with the primary pulley 2, and a torque converter 6 having a lockup clutch and a forward-reverse switching mechanism (frictional engagement element) 7 are provided between the engine 5 and the primary pulley 2 in sequence from the engine 5 side.

The forward-reverse switching mechanism 7 has a double pinion planetary gear set 7a as a principle constitutional element, a sun gear of which is coupled to the engine 5 via the torque converter 6 and a carrier of which is coupled to the primary pulley 2. The forward-reverse switching mechanism 7 further includes a forward clutch 7b that directly couples the sun gear and the carrier of the double pinion planetary gear set 7a and a reverse brake 7c that fixes a ring gear. When the forward clutch 7b is engaged, a rotation input from the engine 5 via the torque converter 6 is transmitted as is to the primary pulley 2, and when the reverse brake 7c is engaged, the rotation input from the engine 5 via the torque converter 6 is reversed before being transmitted to the primary pulley 2.

The rotation of the primary pulley 2 is transmitted to the secondary pulley 3 via the V belt 4, whereupon the rotation of the secondary pulley 3 is transmitted to a vehicle wheel via an output shaft 8, a gear set 9, and a differential gear device 10.

To enable modification of a rotation transmission ratio (gear ratio) between the primary pulley 2 and secondary pulley 3 during the power transmission described above, one of a plurality of conical plates forming the respective V grooves of the primary pulley 2 and the secondary pulley 3 is set as a fixed conical plate 2a, 3a, and another conical plate 2b, 3b is set as a movable conical plate (movable flange) capable of displacing in an axial direction. The movable conical plates 2b, 3b are biased toward the fixed conical plates 2a, 3a when a primary pulley pressure Ppri and a secondary pulley pressure Psec created using a line pressure as a source pressure are supplied to a primary pulley chamber 2c and a secondary pulley chamber 3c, and as a result, the V belt 4 is caused to engage with the conical plates frictionally such that power is transmitted between the primary pulley 2 and the secondary pulley 3.

During a shift, a V groove width of the two pulleys 2, 3 is varied in accordance with a differential pressure between the primary pulley pressure Ppri and secondary pulley pressure Psec, which are generated to correspond to a target gear ratio Ratio0, whereby a winding arc diameter of the V belt 4 relative to the pulleys 2, 3 is varied continuously, and as a result, an actual gear ratio Ratio is modified such that the target gear ratio Ratio0 is realized.

The primary pulley pressure Ppri and secondary pulley pressure Psec are controlled by a shift control hydraulic circuit 11 together with an output of an engagement oil pressure of the forward clutch 7b, which is engaged when a forward traveling range is selected, and the reverse brake 7c, which is engaged when a reverse traveling range is selected. The shift control hydraulic circuit 11 executes control in response to a signal from a transmission controller 12.

A signal from a primary pulley rotation speed sensor 13 that detects a primary pulley rotation speed Npri, a signal from a secondary pulley rotation speed sensor 14 that detects a secondary pulley rotation speed Nsec, a signal from a secondary pulley pressure sensor 15 that detects the secondary pulley pressure Psec, a signal from a throttle opening sensor 16 that detects an opening TVO of a throttle valve, a selected range signal from an inhibitor switch 17, a signal from an oil temperature sensor 18 that detects a shift working oil temperature TMP, a signal (engine rotation speed and fuel injection period) relating to an input torque Ti from an engine controller 19 responsible for controlling the engine 5, a brake signal from a brake pedal SW 28 that detects whether or not a brake pedal has been operated, and a signal from an acceleration sensor 20 are input into the transmission controller 12.

Figure 2:
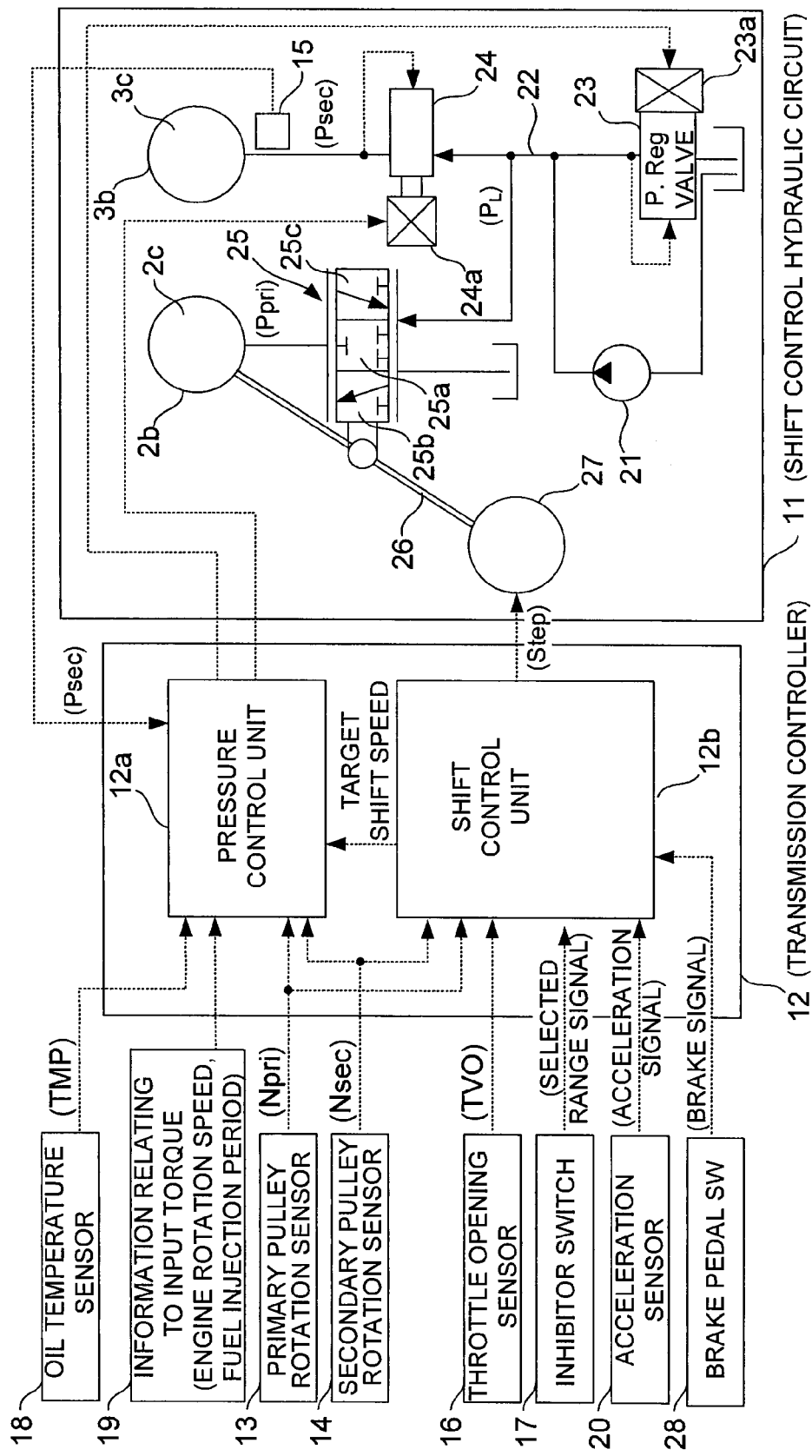
FIG. 2 is a constitutional diagram of a shift control hydraulic circuit and a transmission controller according to an embodiment of this invention.

Next, the shift control hydraulic circuit 11 and the transmission controller 12 will be described using the constitutional diagram in FIG. 2. First, the shift control hydraulic circuit 11 will be described.

The shift control hydraulic circuit 11 includes an engine-driven oil pump 21, and uses a pressure regulator valve 23 to regulate a pressure of working oil supplied to an oil line 22 by the oil pump 21 to a predetermined line pressure PL. The pressure regulator valve 23 controls the line pressure PL in accordance with a drive duty input into a solenoid 23a.

The line pressure PL of the oil line 22 is on the one hand regulated by a pressure reducing valve 24 and supplied to the secondary pulley chamber 3c as the secondary pulley pressure Psec, and on the other hand regulated by a shift control valve 25 and supplied to the primary pulley chamber 2c as the primary pulley pressure Ppri. The pressure reducing valve 24 controls the secondary pulley pressure Psec in accordance with a drive duty input into a solenoid 24a.

The shift control valve 25 includes a neutral position 25a, a pressure increasing position 25b, and a pressure reducing position 25c, and to switch between these valve positions, the shift control valve 25 is connected to the middle of a shift link 26. The shift link 26 is connected to a step motor 27 serving as a shift actuator at one end, and to the movable conical plate 2b of the primary pulley 2 at the other end.

The step motor 27 is set in an operating position which is advanced from a reference position by a step count Step corresponding to the target gear ratio Ratio0, and when the step motor 27 is operated, the shift link 26 swings using a connecting portion with the movable conical plate 2b as a fulcrum. As a result, the shift control valve 25 is moved from the neutral position 25a to the pressure increasing position 25b or the pressure reducing position 25c. Hence, the primary pulley pressure Ppri is increased using the line pressure PL as a source pressure or decreased through a drain, and thus the differential pressure between the primary pulley pressure Ppri and secondary pulley pressure Psec is varied so as to generate an upshift to a High side gear ratio or a downshift to a Low side gear ratio. Accordingly, the actual gear ratio Ratio varies in accordance with the target speed ratio Ratio0.

A shift progression is fed back to a corresponding end of the shift link 26 via the movable conical plate 2b of the primary pulley 2, whereupon the shift link 26 swings about a connecting portion with the step motor 27 in a direction which returns the shift control valve 25 from the pressure increasing position 25b or the pressure reducing position 25c to the neutral position 25a. Hence, when the target speed ratio Ratio0 is achieved, the shift control valve 25 is returned to the neutral position 25a so that the actual gear ratio Ratio can be held at the target gear ratio Ratio0.

The solenoid drive duty of the pressure regulator valve 23, the solenoid drive duty of the pressure reducing valve 24, and a shift command (the step count) input into the step motor 27 are issued by the transmission controller 12. The transmission controller 12 also performs control to determine whether or not to supply the engagement oil pressure to the forward clutch 7b and the reverse brake 7c shown in FIG. 1. The transmission controller 12 is constituted by a pressure control unit 12a and a shift control unit 12b.

The pressure control unit 12a determines the solenoid drive duty of the pressure regulator valve 23 and the solenoid drive duty of the pressure reducing valve 24. The shift control unit 12b calculates a target gear ratio DsrRTO and the target gear ratio Ratio0.

When a vehicle installed with the V belt continuously variable transmission 1 having the above constitution decelerates, a downshift is executed to improve a restarting ability following the deceleration, whereby the gear ratio is shifted to the Low side. As a result, the primary pulley pressure Ppri of the primary pulley 2 decreases through a drain. The secondary pulley pressure Psec of the secondary pulley 3 is then controlled such that a predetermined gear ratio is achieved, whereby the downshift is completed.

When the vehicle decelerates rapidly, the downshift is also performed rapidly in accordance with the rapid deceleration. In other words, the vehicle speed VSP, the primary pulley rotation speed Npri, and the secondary pulley rotation speed Nsec all decrease rapidly, and the shift is executed on the basis thereof, leading to a rapid reduction in the primary pulley pressure Ppri. As a result, a gripping force of the belt 4 and the primary pulley 2 decreases transiently.

If, in this condition, vehicle wheel locking occurs or an inertia torque of the engine, the transmission, or the like increases rapidly due to the rapid deceleration, the belt 4 may slip. Slippage of the belt 4 causes damage to the belt 4 or the pulleys, and must therefore be forestalled.

Hence, in this embodiment of the invention, as will be described below, optimum shift control for securing the restarting ability from this condition while preventing slippage of the belt 4 is executed by controlling the gear ratio when the vehicle decelerates rapidly.

Figure 3:
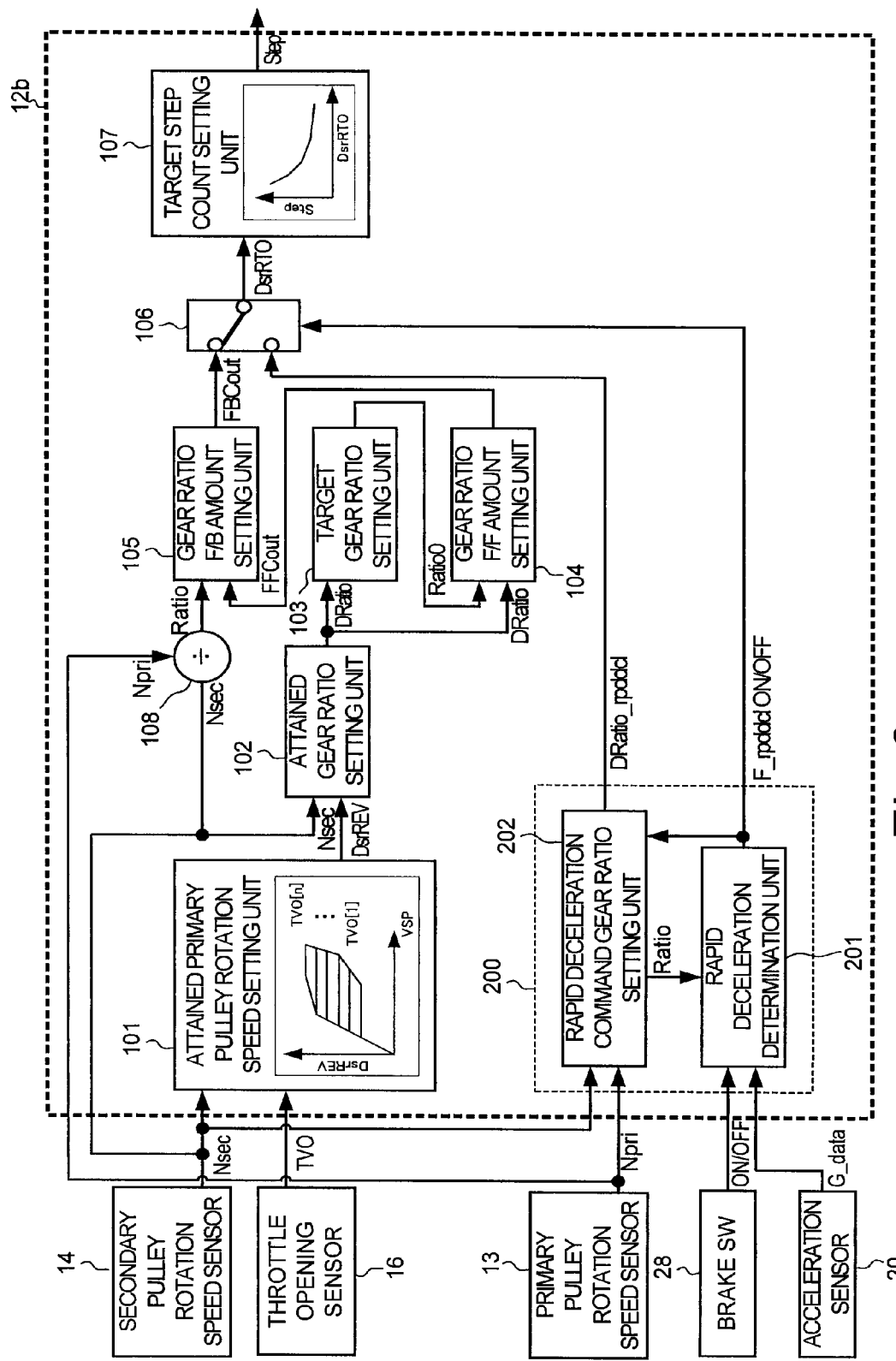
FIG. 3 is a block diagram of a shift control unit according to an embodiment of this invention.

FIG. 3 is a functional block diagram centering on the shift control unit 12b of the transmission controller 12 according to this embodiment of the invention.

As described above, the shift control unit 12b calculates the target gear ratio Ratio0 on the basis of vehicle conditions such as the throttle opening TVO, the primary pulley rotation speed Npri and the secondary pulley rotation speed Nsec, and an acceleration request. The shift control unit 12b then controls the gear ratio by calculating the step count Step of the step motor 27 corresponding to the target gear ratio Ratio0 and issuing a command to the step motor 27 on the basis thereof.

The shift control unit 12b calculates the target gear ratio Ratio0 and the step count Step by means of the following constitution.

An attained primary pulley rotation speed setting unit 101 sets an attained primary pulley rotation speed DsrREV from the secondary pulley rotation speed Nsec detected by the secondary pulley rotation speed sensor 14 and the throttle opening TVO detected by the throttle opening sensor 16 by referring to a map.

An attained gear ratio setting unit 102 calculates an attained gear ratio DRatio from the attained primary pulley rotation speed DsrREV and the secondary pulley rotation speed Nsec.

A target gear ratio setting unit 103 calculates the target gear ratio Ratio0 to be followed by the actual gear ratio Ratio at a desired response on the basis of the attained gear ratio DRatio.

A gear ratio F/F amount setting unit 104 calculates a command gear ratio FFCout from the target gear ratio Ratio0 and the attained gear ratio DRatio through feed-forward control.

A gear ratio F/B amount setting unit 105 calculates an F/B compensation gear ratio FBCout by feeding the actual gear ratio Ratio back to the command gear ratio FFCout.

A selector unit 106 selects one of the calculated F/B compensation gear ratio FBCout and a rapid deceleration command gear ratio DRatio_rpddcl, to be described below, and outputs the selected value as a control target gear ratio DsrRTO.

A target step count setting unit 107 calculates the step count Step, which serves as a command value input into the step motor 27, on the basis of the control target gear ratio DsrRTO by referring to a target step count map.

A divider 108 calculates the actual gear ratio Ratio as a ratio between the secondary pulley rotation speed Nsec and the primary pulley rotation speed Npri.

The shift control unit 12b further comprises a rapid deceleration control unit 200.

The rapid deceleration control unit 200 is constituted a rapid deceleration determination unit 201 that determines whether or not rapid deceleration is underway from the presence or absence of a brake signal obtained from the brake pedal SW 28 and a deceleration G_data obtained from the acceleration sensor 20, and a rapid deceleration command gear ratio setting unit 202 that calculates the rapid deceleration command gear ratio DRatio_rpddcl on the basis of the actual gear ratio Ratio, which is calculated from the secondary pulley rotation speed Nsec and the primary pulley rotation speed Npri, when the rapid deceleration determination unit 201 determines that rapid deceleration is underway.

Figure 4:
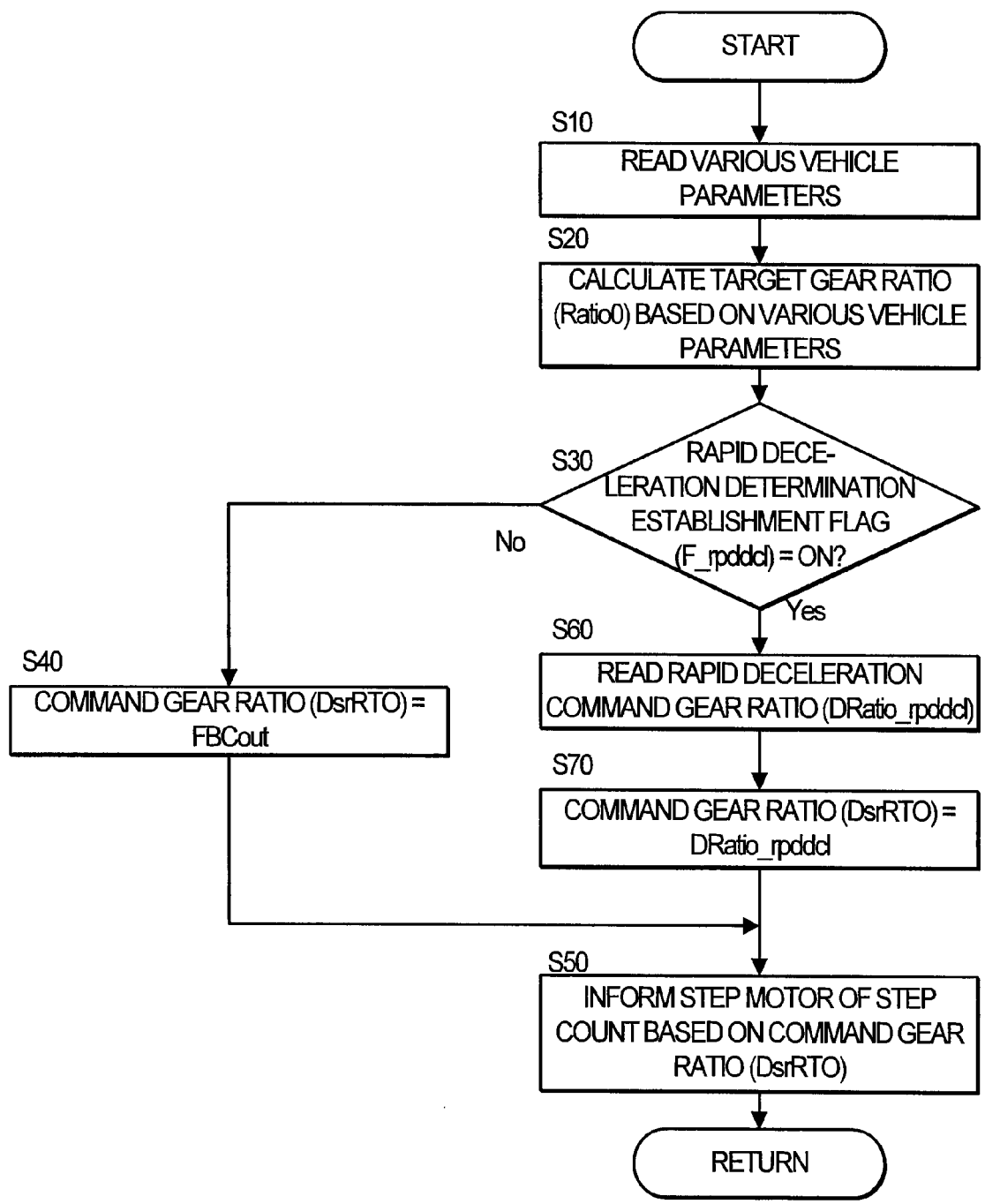
FIG. 4 is a flowchart of main processing according to an embodiment of this invention.

Next, main processing executed by the shift control unit 12b will be described on the basis of a flowchart shown in FIG. 4. The main processing shown in the flowchart of FIG. 4 is executed by the shift control unit 12b at predetermined intervals (of 10 ms, for example).

First, the shift control unit 12b obtains various vehicle parameters to be used in the following processing from the sensors and so on (S10).

The various vehicle parameters include the primary pulley rotation speed Npri detected by the primary pulley rotation speed sensor 13, the secondary pulley rotation speed Nsec detected by the secondary pulley rotation speed sensor 14, the throttle opening TVO detected by the throttle opening sensor 16, and the vehicle speed VSP. The vehicle speed VSP may be obtained from a vehicle sensor or the like provided in the vehicle, or may be calculated by multiplying the secondary pulley rotation speed Nsec, i.e. an output rotation speed of the V belt continuously variable transmission 1, by a predetermined reduction ratio.

Next, the shift control unit 12b calculates the target gear ratio Ratio0 on the basis of the various vehicle parameters obtained in the step S10 using processing such as that described above with reference to FIG. 3. Further, the shift control unit 12b calculates the F/B compensation gear ratio FBCout, which serves as a control value for determining a displacement of the step motor 27, on the basis of the target gear ratio Ratio0 (S20).

Next, the shift control unit 12b determines whether or not a rapid deceleration determination establishment flag F_rpddcl is established in the rapid deceleration control unit 200 (S30). When it is determined that the rapid deceleration determination establishment flag F_rpddcl is not established, the routine advances to a step S40, and when it is determined that the rapid deceleration determination establishment flag F_rpddcl is established, the routine advances to a step S60.

Figure 5:
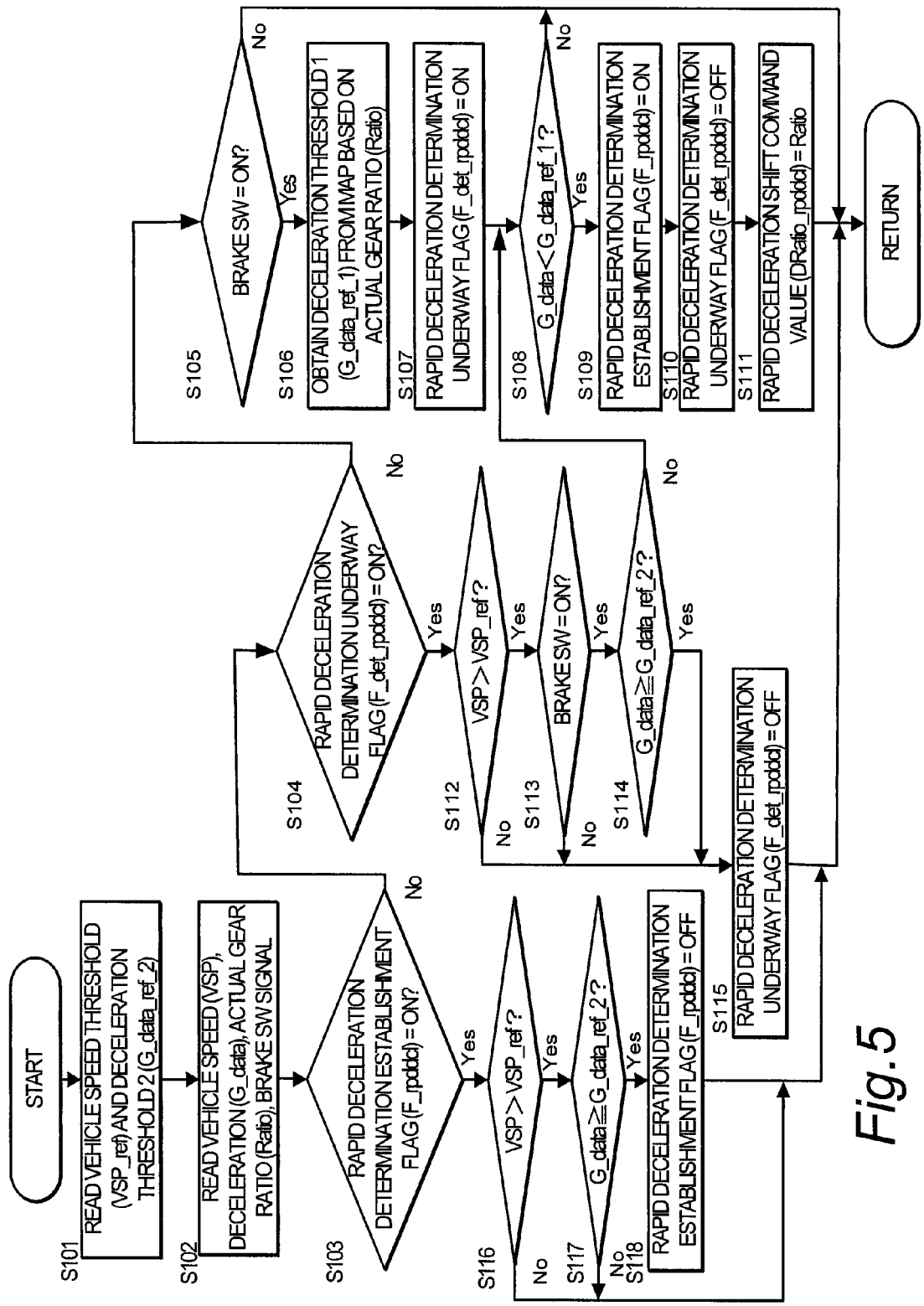
FIG. 5 is a flowchart of rapid deceleration determination processing according to an embodiment of this invention.

Establishment of the rapid deceleration determination establishment flag F_rpddcl is determined through rapid deceleration determination processing shown in FIG. 5.

In the step S40, the shift control unit 12b determines that rapid deceleration is not underway, and therefore sets the F/B compensation gear ratio FBCout as the command gear ratio DsrRTO.

The target step count setting unit 107 then obtains the step count Step from the map on the basis of the command gear ratio DsrRTO, and informs the step motor 27 of the step count Step (S50).

In the step S60, on the other hand, the shift control unit 12b determines that a current vehicle condition corresponds to a rapid deceleration condition. In the rapid deceleration condition, the gear ratio is fixed at a predetermined value to ensure that a rapid downshift is not executed. The rapid deceleration command gear ratio DRatio_rpddcl set by the rapid deceleration command gear ratio setting unit 202 is used as the predetermined value.

In this case, the rapid deceleration determination unit 201 obtains the rapid deceleration command gear ratio DRatio_rpddcl set by the rapid deceleration command gear ratio setting unit 202 (S60). The rapid deceleration determination unit 201 then controls the selector unit 106 to set the value of the rapid deceleration command gear ratio DRatio_rpddcl as the command gear ratio DsrRTO (S70).

The target step count setting unit 107 then obtains the step count Step from the map on the basis of the command gear ratio DsrRTO, and informs the step motor 27 thereof (S50).

By means of the processing shown in the flowchart of FIG. 4, shift control is performed on the basis of the vehicle conditions and the acceleration request during normal travel, i.e. when rapid deceleration is not underway. When it is determined that rapid deceleration is underway, on the other hand, control is performed to fix the gear ratio at the predetermined value, thereby suppressing a rapid downshift.

Next, the rapid deceleration determination processing for determining whether or not rapid deceleration is underway will be described.

FIG. 5 is a flowchart showing the rapid deceleration determination processing executed by the rapid deceleration determination unit 201. This flowchart is executed by the rapid deceleration determination unit 201 at predetermined intervals (of 10 ms, for example) in parallel with the main processing described above.

First, the rapid deceleration determination unit 201 obtains a preset vehicle speed threshold VSP_ref and a deceleration threshold (deceleration threshold 2) G_data_ref_2 (S101). It should be noted that the vehicle speed threshold VSP_ref and the deceleration threshold G_data_ref_2 are set in advance in accordance with the vehicle and stored in advance in a storage device or the like of the transmission controller 12.

As will be described below, the vehicle speed threshold VSP_ref is a threshold for determining whether or not the vehicle is in a stationary condition, and the deceleration threshold G_data_ref_2 is a threshold for determining whether or not the vehicle has emerged from the rapid deceleration condition.

Next, the rapid deceleration determination unit 201 obtains the vehicle speed VSP, the deceleration G_data, the actual gear ratio Ratio, and the brake signal (S102).

The vehicle speed VSP is calculated by multiplying the secondary pulley rotation speed Nsec by a predetermined reduction ratio. The actual gear ratio Ratio is calculated as a ratio between the primary pulley rotation speed Npri and the secondary pulley rotation speed Nsec.

Further, the deceleration G_data is obtained from the value detected by the acceleration sensor 20. It should be noted that in this embodiment, minus side acceleration is handled as deceleration. In other words, when the value of the deceleration is small (the numerical value thereof is large on the minus side), it is assumed that the degree of deceleration is large. Alternatively, the deceleration G_data may be calculated without using the acceleration sensor 20 by determining the vehicle speed VSP and subjecting it to time differentiation.

Next, the rapid deceleration determination unit 201 determines whether or not the rapid deceleration determination establishment flag F_rpddcl is already established (S103).

When it is determined that the rapid deceleration determination establishment flag F_rpddcl is not established, the routine advances to a step S104, and when it is determined that the rapid deceleration determination establishment flag F_rpddcl is established, the routine advances to a step S116.

The rapid deceleration determination establishment flag F_rpddcl is established when the vehicle is determined to be in the rapid deceleration condition. When the rapid deceleration determination establishment flag F_rpddcl is not established in the step S103, the routine advances to the processing of steps S104 to S115, in which processing is executed to determine whether or not rapid deceleration is underway. When the rapid deceleration determination establishment flag F_rpddcl is already established, on the other hand, the routine advances to the processing of steps S116 to S118, in which processing to determine whether or not the vehicle has emerged from the rapid deceleration condition is executed.

In the step S104, the rapid deceleration determination unit 201 determines whether or not a rapid deceleration determination underway flag F_det_rpddcl is established. When it is determined that the rapid deceleration determination underway flag F_det_rpddcl is not established, the routine advances to a step S105, and when it is determined that the rapid deceleration determination underway flag F_det_rpddcl is established, the routine advances to a step S112.

The rapid deceleration determination underway flag F_det_rpddcl is established when, following the processing of the steps S105 to S107, the brake pedal SW 28 turns ON, or in other words the brake pedal is operated by a driver. When the rapid deceleration determination underway flag F_det_rpddcl is established, this means that the rapid deceleration determination is underway, and therefore a determination is made in accordance with the vehicle conditions (deceleration, gear ratio, and so on) during the rapid deceleration determination as to whether or not rapid deceleration is underway.

In the step S105, a determination is made as to whether or not the brake pedal SW 28 is ON, or in other words whether or not the brake pedal has been operated by the driver. If the brake has not been operated, there is no need to determine whether or not rapid deceleration is underway, and therefore the processing of this flowchart is terminated.

When it is determined that the brake has been operated by the driver, the processing advances to the rapid deceleration determination. First, the routine advances to a step S106, in which the rapid deceleration determination unit 201 obtains a deceleration threshold (deceleration threshold 1) G_data_ref_1 from a map provided in the rapid deceleration determination unit 201 on the basis of the current actual gear ratio Ratio.

Figure 6:
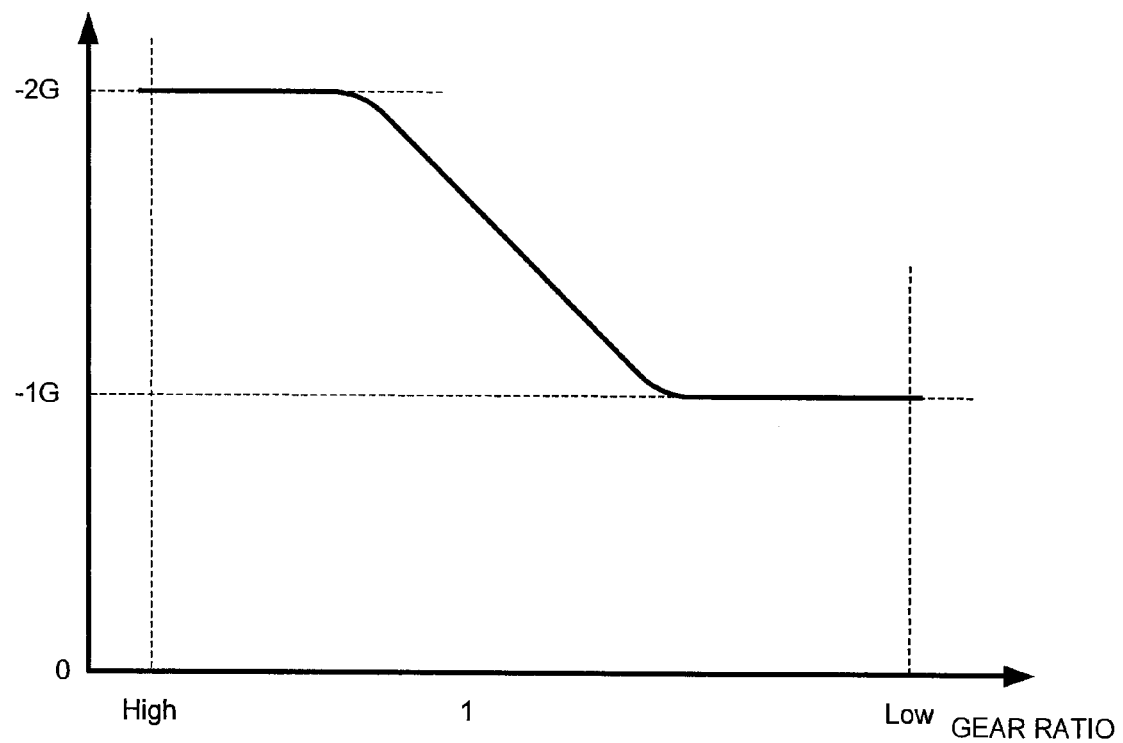
FIG. 6 is an illustrative view of a map for setting a deceleration threshold according to an embodiment of this invention.

FIG. 6 is an illustrative view showing an example of a map for setting the deceleration threshold of the target step count setting unit 107.

In the map shown in FIG. 6, the deceleration threshold G_data_ref_1 is associated with the actual gear ratio Ratio.

According to the map shown in FIG. 6, the deceleration threshold G_data_ref_1 is set at a steadily larger degree of deceleration as the actual gear ratio Ratio shifts to the High side.

For example, when the actual gear ratio Ratio is on the High side, the deceleration threshold G_data_ref_1 is set at a comparatively large degree of deceleration (the value of the deceleration is set at −2G).

Further, when the actual gear ratio Ratio is on the Low side, the deceleration threshold G_data_ref_1 is set at a comparatively small degree of deceleration (the value of the deceleration is set at −1G).

The rapid deceleration determination unit 201 obtains the deceleration threshold G_data_ref_1 corresponding to the current actual gear ratio Ratio from a map such as that shown in FIG. 6.

Next, the rapid deceleration determination unit 201 establishes the rapid deceleration determination underway flag F_det_rpddcl (S107). Establishment of the rapid deceleration determination underway flag F_det_rpddcl indicates that the rapid deceleration determination is underway.

Next, the rapid deceleration determination unit 201 compares the actual deceleration G_data obtained in the step S102 with the deceleration threshold G_data_ref_1 obtained in the step S106. Then, on the basis of the comparison, the rapid deceleration determination unit 201 determines whether or not the value of the actual deceleration G_data is smaller than the value of the deceleration threshold G_data_ref_1, or in other words whether or not the degree of deceleration of the actual deceleration G_data is larger than the deceleration threshold G_data_ref_1 (S108).

When it is determined that the degree of deceleration of the actual deceleration G_data is larger than the deceleration threshold G_data_ref_1, the rapid deceleration determination unit 201 determines that rapid deceleration is underway, and establishes the rapid deceleration determination establishment flag F_rpddcl in a step S109. The rapid deceleration determination underway flag F_det_rpddcl is then canceled (S110). Next, the rapid deceleration determination unit 201 issues a request to the rapid deceleration command gear ratio setting unit 202 to set the actual gear ratio Ratio obtained in the step S102 as the value of the rapid deceleration command gear ratio DRatio_rpddcl (S111). The processing of this flowchart is then terminated.

When it is determined that the degree of deceleration of the actual deceleration G_data is equal to or smaller than the deceleration threshold G_data_ref_1, on the other hand, the rapid deceleration determination unit 201 determines that rapid deceleration is not underway, whereupon the processing of this flowchart is terminated.

When it is determined in the step S104 that the rapid deceleration determination underway flag F_det_rpddcl is already established, or in other words that the rapid deceleration determination is underway, the routine advances to a step S112. In the step S112, first, the rapid deceleration determination unit 201 determines whether or not the current vehicle speed VSP is higher than the vehicle speed threshold VSP_ref obtained in the step S101. The vehicle speed threshold VSP_ref is a threshold for determining whether or not the vehicle is stationary (or about to stop), and is set at 3 km/h, for example.

When it is determined that the vehicle speed VSP is higher than the vehicle speed threshold VSP_ref, the vehicle is determined to be still traveling, and therefore the routine advances to a step S113 in order to make a further determination. When it is determined that the vehicle speed VSP is equal to or lower than the vehicle speed threshold VSP_ref, the vehicle is determined to be in a stationary condition already, and not in the rapid deceleration condition. Hence, the routine advances to a step S115.

In the step S113, the rapid deceleration determination unit 201 determines whether or not the brake pedal SW 28 is ON, or in other words whether or not the brake pedal SW 28 has been operated such that deceleration is underway in the vehicle. When it is determined that the brake pedal SW 28 has been operated, the routine advances to a step S114. When it is determined that the brake pedal SW 28 has not been operated, it is determined that the vehicle is not in the rapid deceleration condition, and therefore the routine advances to the step S115.

In the step S114, the rapid deceleration determination unit 201 compares the actual deceleration G_data obtained in the step S102 to the deceleration threshold G_data_ref_2 obtained in the step S101. On the basis of the comparison result, the rapid deceleration determination unit 201 then determines whether or not the value of the actual deceleration G_data is equal to or greater than the deceleration threshold G_data_ref_2, or in other words whether or not the degree of deceleration of the actual deceleration G_data is equal to or smaller than the deceleration threshold G_data_ref_2.

It should be noted that the deceleration threshold G_data_ref_2 is a value set as hysteresis relative to the deceleration threshold G_data_ref_1 for determining whether or not the rapid deceleration condition has been terminated, and is set at 0G, for example.

When it is determined that the degree of deceleration of the actual deceleration G_data is equal to or greater than the deceleration threshold G_data_ref_2, the rapid deceleration determination unit 201 determines that the rapid deceleration condition is still established, and therefore the routine advances to the step S108, in which a further determination is made as to whether or not rapid deceleration is underway.

When the degree of deceleration of the actual deceleration G_data is determined to be smaller than the deceleration threshold G_data_ref_2, on the other hand, the rapid deceleration determination unit 201 determines that the rapid deceleration condition is no longer established, and therefore the routine advances to the step S115.

When the vehicle is determined to have emerged from the rapid deceleration condition in the processing of the steps S112, S113 and S114 described above, the rapid deceleration determination unit 201 cancels the rapid deceleration determination underway flag F_det_rpddcl in the step S105. Hence, the rapid deceleration determination is initiated using an operation of the brake pedal as a trigger, and when the rapid deceleration condition is not established, the processing of this flowchart is terminated without determining whether or not rapid deceleration is underway.

When it is determined in the processing of the step S103 that the rapid deceleration determination establishment flag F_rpddcl is already established, or in other words that rapid deceleration is underway, the routine advances to the step S116, in which the rapid deceleration determination unit 201 determines whether or not the current vehicle speed VSP is higher than the vehicle speed threshold VSP_ref obtained in the step S101.

When it is determined that the vehicle speed VSP is higher than the vehicle speed threshold VSP_ref, the vehicle is determined to be still traveling, and therefore the processing of this flowchart is terminated. When it is determined that the vehicle speed VSP is equal to or lower than the vehicle speed threshold VSP_ref, the vehicle is determined to be in a stationary condition already, and not in the rapid deceleration condition. Hence, the routine advances to a step S117.

In the step S117, the rapid deceleration determination unit 201 compares the actual deceleration G_data obtained in the step S102 to the deceleration threshold G_data_ref_2 obtained in the step S101. On the basis of the comparison result, the rapid deceleration determination unit 201 then determines whether or not the value of the actual deceleration G_data is equal to or greater than the deceleration threshold G_data_ref_2, or in other words whether or not the degree of deceleration of the actual deceleration G_data is equal to or smaller than the deceleration threshold G_data_ref_2.

When it is determined that the degree of deceleration of the actual deceleration G_data is equal to or greater than the deceleration threshold G_data_ref_2, the rapid deceleration determination unit 201 determines that the rapid deceleration condition is still established, and therefore the processing of this flowchart is terminated.

When the degree of deceleration of the actual deceleration G_data is determined to be smaller than the deceleration threshold G_data_ref_2, on the other hand, the rapid deceleration determination unit 201 determines that the rapid deceleration condition is no longer established, and therefore the routine advances to the step S118.

When the vehicle is determined to have emerged from the rapid deceleration condition in the processing of the steps S116 and S117 described above, the rapid deceleration determination unit 201 cancels the rapid deceleration determination establishment flag F_det_rpddcl in the step S118. The processing of this flowchart is then terminated.

In the processing of the flowchart shown in FIG. 5, a determination is made as to whether or not the rapid deceleration condition is established using an operation of the brake pedal SW 28 as a trigger. In particular, the threshold (deceleration threshold G_data_ref_1) for determining whether or not the rapid deceleration condition is established is set at a steadily larger degree of deceleration as the gear ratio increases, and therefore, when the gear ratio is on the High side, control to fix the gear ratio is performed only in cases where the degree of deceleration of the rapid deceleration is large.

According to the embodiment of this invention described above, when the vehicle is in the rapid deceleration condition, control is performed to fix the gear ratio at a predetermined value to prevent belt slippage, which is generated by a reduction in belt gripping force caused by a rapid reduction in the primary pulley pressure Ppri following a rapid downshift accompanying the rapid deceleration. By performing this control, rapid downshifts during rapid deceleration are suppressed, and therefore belt slippage caused by a rapid reduction in the primary pulley pressure Ppri can be prevented.

Further, the threshold (deceleration threshold G_data_ref_1) for determining whether or not the rapid deceleration condition is established is set at a steadily larger degree of deceleration (minus side acceleration) as the gear ratio shifts to the High side. Therefore, when the gear ratio is on the High side, the control to fix the gear ratio is performed through rapid deceleration control only in cases where the degree of deceleration is large. As a result, deterioration of the restarting ability occurring when the vehicle is stopped while the gear ratio remains fixed on the High side can be prevented.

This invention is not limited to the embodiment described above, and naturally includes various modifications and improvements within the scope of the technical spirit thereof.

This application claims priority from Japanese Patent Application P2008-142733 filed May 30, 2008, which is incorporated herein by reference.

What is claimed is:

1. A control device for a belt type continuously variable transmission in which a belt is wound around a primary pulley into which a power output by a power source is input and a secondary pulley connected to an output side of a driving system of a vehicle, and an oil pressure supplied to the primary pulley is regulated by driving a step motor, thereby modifying a groove width of the primary pulley and the secondary pulley such that a rotation speed of the power source is output while being varied continuously, comprising:
a deceleration detecting unit configured to detect a deceleration of the vehicle;
a brake operation detecting unit configured to detect an operation of a brake; and
a gear ratio control unit configured to:
set a target gear ratio on a basis of an operating condition of the vehicle,
control a drive amount of the step motor such that an actual gear ratio converges with the target gear ratio,
control the drive amount of the step motor such that a predetermined gear ratio is maintained when the deceleration of the vehicle exceeds a predetermined threshold,
determine the predetermined threshold on a basis of the actual gear ratio upon detection of the operation of the brake, and
set the predetermined threshold at a larger degree of deceleration as the actual near ratio shifts toward a high side.

2. A control method for a belt type continuously variable transmission in which a belt is wound around a primary pulley into which a power output by a power source is input and a secondary pulley connected to an output side of a driving system of a vehicle, and an oil pressure supplied to the primary pulley is regulated by driving a step motor, thereby modifying a groove width of the primary pulley and the secondary pulley such that a rotation speed of the power source is output while being varied continuously, the method comprising:
detecting a deceleration of the vehicle;
detecting an operation of a brake;
setting a target gear ratio on a basis of an operating condition of the vehicle;
controlling a drive amount of the step motor such that an actual gear ratio converges with the target gear ratio;
controlling the gear ratio by controlling the drive amount of the step motor such that a predetermined gear ratio is maintained when the deceleration of the vehicle exceeds a predetermined threshold,
wherein the predetermined threshold is determined on a basis of the actual gear ratio upon detection of the operation of the brake, and the predetermined threshold is set at a larger degree deceleration as the actual gear ratio shifts toward a high side.

3. A control device for a belt type continuously variable transmission in which a belt is wound around a primary pulley into which a power output by a power source is input and a secondary pulley connected to an output side of a driving system of a vehicle, and an oil pressure supplied to the primary pulley is regulated by driving a step motor, thereby modifying a groove width of the primary pulley and the secondary pulley such that a rotation speed of the power source is output while being varied continuously, comprising:
deceleration detecting means for detecting a deceleration of the vehicle;
brake operation detecting means for detecting an operation a brake; and
gear ratio control means for setting a target gear ratio on a basis of an operating condition of the vehicle, controlling a drive amount of the step motor such that an actual gear ratio converges with the target gear ratio, and when the deceleration of the vehicle exceeds a predetermined threshold, controlling the gear ratio by controlling the drive amount of the step motor such that a predetermined gear ratio is maintained,
wherein the gear ratio control means determines the predetermined threshold on a basis of the actual gear ratio upon detection of the operation of the brake, and sets the predetermined threshold at a larger degree of deceleration as the actual gear ratio shifts toward a high side.

4. The control device according to claim 1, wherein the high side is higher relative to a low side.

5. The control method according to claim 2, wherein the high side is higher relative to a low side.

6. The control device according to claim 3, wherein the high side is higher relative to a low side.

\* \* \* \* \*